US007995309B2

United States Patent
Kakuishi et al.

(10) Patent No.: US 7,995,309 B2
(45) Date of Patent: Aug. 9, 2011

(54) MAGNETIC RECORDING MEDIUM, MAGNETIC SIGNAL REPRODUCTION METHOD AND MAGNETIC SIGNAL REPRODUCTION SYSTEM

(75) Inventors: Yutaka Kakuishi, Kanagawa (JP); Ryota Suzuki, Kanagawa (JP); Masayuki Usui, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 485 days.

(21) Appl. No.: 12/240,209

(22) Filed: Sep. 29, 2008

(65) Prior Publication Data
US 2009/0086368 A1    Apr. 2, 2009

(30) Foreign Application Priority Data
Sep. 28, 2007  (JP) .................................. 2007-256652

(51) Int. Cl.
*G11B 5/735* (2006.01)

(52) U.S. Cl. ........................................ 360/134; 428/845
(58) Field of Classification Search .................. 360/134; 428/842, 845, 845.1, 845.2
See application file for complete search history.

(56) References Cited

U.S. PATENT DOCUMENTS

| | | | | |
|---|---|---|---|---|
| 6,228,461 B1* | 5/2001 | Sueki et al. | | 428/98 |
| 6,468,628 B2* | 10/2002 | Sueoka et al. | | 428/141 |
| 6,780,531 B2* | 8/2004 | Tani et al. | | 428/840.3 |
| 6,797,373 B2* | 9/2004 | Noguchi et al. | | 428/840.3 |
| 6,805,942 B2* | 10/2004 | Doushita et al. | | 428/844.8 |
| 6,994,925 B2* | 2/2006 | Masaki | | 428/842.8 |
| 7,381,484 B2* | 6/2008 | Ejiri | | 428/845.1 |
| 2004/0265643 A1 | 12/2004 | Ejiri | | |

FOREIGN PATENT DOCUMENTS
JP    2005-18821 A    1/2005
* cited by examiner

*Primary Examiner* — Angel A. Castro
(74) *Attorney, Agent, or Firm* — Sughrue Mion, PLLC

(57) ABSTRACT

The present invention relates to a magnetic recording medium comprising a magnetic layer comprising a ferromagnetic powder and a binder on one surface of a nonmagnetic support and a backcoat layer comprising a granular material and a binder on the other surface of the nonmagnetic support, wherein the backcoat layer has an average surface roughness ranging from 15 to 25 nm, as measured by an atomic force microscope, and a density of protrusions equal to or greater than 50 nm in height ranges from 1 to 50/mm$^2$ on the backcoat layer surface, as measured by a three-dimensional surface roughness meter with a contact needle. The present invention further relates to a method of reproducing magnetic signals and a magnetic signal reproduction system.

6 Claims, 1 Drawing Sheet

MAGNETIC RECORDING MEDIUM, MAGNETIC SIGNAL REPRODUCTION METHOD AND MAGNETIC SIGNAL REPRODUCTION SYSTEM

CROSS-REFERENCE TO RELATED APPLICATIONS

This application claims the benefit of priority under 35 USC 119 to Japanese Patent Application No. 2007-256652 filed on Sep. 28, 2007, which is expressly incorporated herein by reference in its entirety.

BACKGROUND OF THE INVENTION

1. Field of the Invention

The present invention relates to a magnetic recording medium, and more specifically, to a magnetic recording medium having good running durability and stability for use in high-density recording, and to a magnetic signal reproduction method and magnetic signal reproduction system employing the magnetic recording medium.

2. Discussion of the Background

Magnetic recording media are employed to record a variety of information such as audio, video, and text. In recent years, the demand for higher density recording has increased with the increased quantity of information being recorded. There is need for a magnetic recording medium affording good electromagnetic characteristics with few defects in the magnetic layer surface causing signal loss.

Since magnetic recording media are employed to repeatedly read and write information, running durability with repeated use (repeat running durability) is required. To achieve good repeat running durability, a backcoat layer having surface protrusions is provided on the opposite surface of the nonmagnetic support from the surface on which the magnetic layer is provided to reduce the frictional coefficient. However, when a magnetic recording medium is stored in a rolled state during manufacturing or when a magnetic tape is stored wound on a reel hub following production of the final product, the protrusions on the surface of the backcoat layer transfer to the surface of the magnetic layer, forming minute indentations in what is known as "reverse transfer." As a result, not only do electromagnetic characteristics end up deteriorating, but there are drawbacks in that minute dropout increases, increasing the error rate. On the other hand, when the surface of the backcoat layer is smoothed to eliminate problems such as "reverse transfer," the shape of the tape when wound following running becomes chaotic, a winding defect known as "radial" occurs, and tape deformation such as creasing of tape edges sometimes occurs.

By contrast, to achieve both a reduction in reverse transfer and improve the appearance in the winding state, Japanese Unexamined Patent Publication (KOKAI) 2005-18821 or English language family member US 2004/0265643 A1 proposes a medium in which the distribution of protrusions on the surface of the backcoat layer as measured by an atomic force microscope (AFM) is specified. The contents of these applications are expressly incorporated herein by reference in their entirety. However, to deal with the higher density recording of recent years, an even greater reduction in dropout is needed.

SUMMARY OF THE INVENTION

An aspect of the present invention provides for a magnetic recording medium having both good electromagnetic characteristics and running durability.

The present inventors conducted extensive research into achieving such magnetic recording media, resulting in the following discoveries.

Controlling the surface properties of the backcoat layer to reduce reverse transfer to the magnetic layer has been proposed for some time (for example, see Japanese Unexamined Patent Publication (KOKAI) 2005-18821). In these techniques, the surface properties of the backcoat layer are evaluated by AFM. However, based on the results of research by the present inventors, it has been determined that a good correlation does not necessarily exist between the backcoat layer surface properties as measured by AFM and defects in the magnetic layer surface that cause dropout in the high-density recording region. The present inventors conducted further research, resulting in the discovery that, by controlling the density of protrusions on the surface of the backcoat layer as measured with a three-dimensional surface roughness meter with a contact needle in addition to the backcoat surface properties as measured by AFM, it was possible to achieve both a reduction in dropout and running durability in the high-density recording region. This was attributed to the fact that since the area measured with a three-dimensional surface roughness meter with a contact needle is larger than that measured by AFM, a good correlation can be achieved between the surface protrusion density of the backcoat layer that is measured with the above roughness meter and the defects (indentations) in the magnetic layer surface that cause dropout in the high-density recording region.

Based on the above discoveries, the present inventors conducted further research, devising the present invention.

An aspect of the present invention relates to a magnetic recording medium comprising a magnetic layer comprising a ferromagnetic powder and a binder on one surface of a nonmagnetic support and a backcoat layer comprising a granular material and a binder on the other surface of the nonmagnetic support, wherein the backcoat layer has an average surface roughness ranging from 15 to 25 nm, as measured by an atomic force microscope, and a density of protrusions equal to or greater than 50 nm in height ranges from 1 to 50/mm$^2$ on the backcoat layer surface, as measured by a three-dimensional surface roughness meter with a contact needle.

The density of protrusions equal to or greater than 50 nm in height may range from 1 to 30/mm$^2$ on the backcoat layer surface, as measured by a three-dimensional surface roughness meter with a contact needle.

The nonmagnetic support may have a density of protrusions equal to or greater than 50 nm in height ranging from 1 to 150/mm$^2$ on the surface on the backcoat layer side, as measured by a three-dimensional surface roughness meter with a contact needle.

The number of indentations with a depth of equal to or greater than 30 nm may be equal to or less than 100 per 40 micrometer square on the magnetic layer surface, as measured by an atomic force microscope.

Another aspect of the present invention relates to a method of reproducing magnetic signals, comprising:

reproducing magnetic signals that have been recorded on the above magnetic recording medium with a reproduction head with a track width ranging from 1 to 5 μm.

A further aspect of the present invention relates to a magnetic signal reproduction system, comprising:

the above magnetic recording medium, and a reproduction head with a track width ranging from 1 to 5 μm.

The present invention can provide a magnetic recording medium having both good electromagnetic characteristics and good running durability.

BRIEF DESCRIPTION OF THE DRAWINGS

The present invention will be described in the following text by the exemplary, non-limiting embodiments shown in the figures, wherein.

Figure 1:
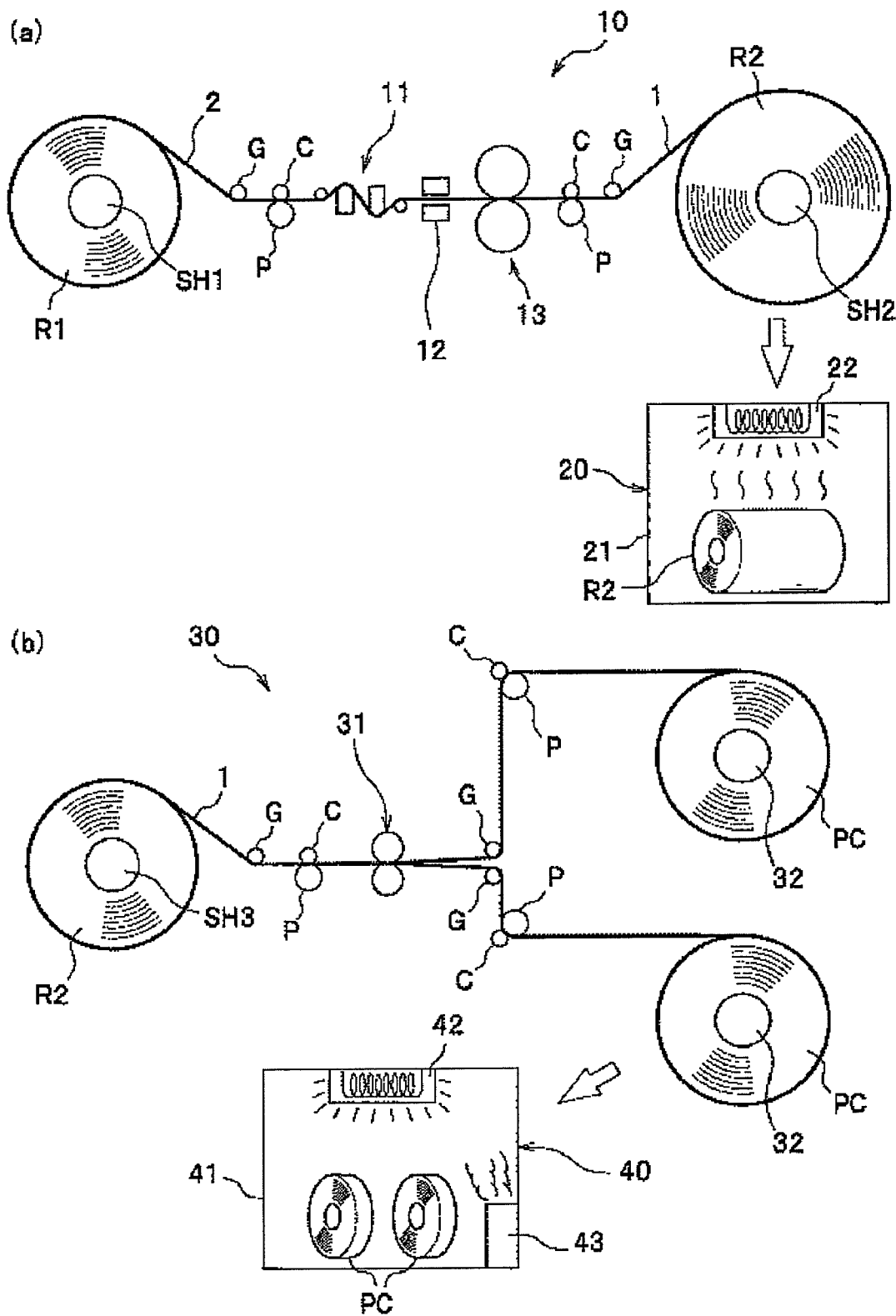
FIG. 1 is a schematic of the equipment used to manufacture a magnetic tape; (a) shows equipment corresponding to the process from the stock material manufacturing step to the distortion reduction step, and (b) shows equipment corresponding to the process from the stock material cutting step to the stock material heating step.

Explanations of symbols in the drawings are as follows:
1 Stock material
2 Support
3 Magnetic layer
4 Backcoat layer
4a Microprotrusions
10 Stock material manufacturing device
11 Coating device
12 Drier
13 Calendering device
20 Distortion-reduction device
30 Stock material cutter
31 Cutter
32 Hub
40 Heating device
21, 41 Storing part
22, 42 Heater
43 Humidifier
MT Magnetic tape
PC Pancake
R1 Support roll
R2 Stock material roll
SH1, SH2, SH3 Shaft
C, G, P Roller

DETAILED DESCRIPTIONS OF THE EMBODIMENTS

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The present invention relates to a magnetic recording medium comprising a magnetic layer comprising a ferromagnetic powder and a binder on one surface of a nonmagnetic support and a backcoat layer comprising a granular material and a binder on the other surface of the nonmagnetic support. In the magnetic recording medium of the present invention, the backcoat layer has an average surface roughness ranging from 15 to 25 nm, as measured by an atomic force microscope (AFM), and a density of protrusions equal to or greater than 50 nm in height ranges from 1 to 50/mm² on the backcoat layer surface, as measured by a three-dimensional surface roughness meter with a contact needle (also referred to as "contact needle-type three-dimensional surface roughness meter", hereinafter).

The present inventors discovered that the average surface roughness of the backcoat layer surface as measured by AFM and the density of protrusions equal to or greater than 50 nm in height on the backcoat layer surface as measured by contact needle-type three-dimensional surface roughness meter affect both running durability and electromagnetic characteristics. They further discovered that only by controlling both was it possible to achieve both running durability and electromagnetic characteristics, particularly electromagnetic characteristics in the high-density recording region. This was attributed to the different areas measured by the contact needle-type three-dimensional surface roughness meter and AFM, and that controlling just one of the two was insufficient.

At an average surface roughness of the backcoat layer surface as measured by AFM of less than 15 nm, it is impossible to maintain running properties by the backcoat layer, and running becomes unstable. Further, air entrained between tape layers tends not to be discharged during running, and the tape edges tend to jump off the winding surface. For these reasons, the tape edges tend to be damaged during running. Conversely, at greater than 25 nm, the error rate increases and it becomes difficult to achieve a good S/N ratio. Still further, when the density of protrusions equal to or greater than 50 nm in height on the surface of the backcoat layer as measured by contact needle-type three-dimensional surface roughness meter is 0/mm², it is impossible to maintain running properties by the backcoat layer, stable running becomes difficult, and the tape edges are damaged following running. Still further, when the protrusion density exceeds 50/mm², the error rate rises and it becomes difficult to achieve a good S/N ratio. The average surface roughness of the backcoat layer surface as measured by AFM is preferably 17 to 23 nm, more preferably 18 to 22 nm. The density of protrusions equal to or greater than 50 nm in height on the surface of the backcoat layer as measured by contact needle-type three-dimensional surface roughness meter is preferably 5 to 40/mm², more preferably 10 to 30/nm².

The average surface roughness of the backcoat layer surface as measured by AFM in the present invention means the average center surface roughness, Ra. For example, Ra can be measured by scanning a prescribed area (such as 90×90 micrometers) of the backcoat layer surface with an SPA500 model atomic force microscope made by Seiko Instruments in contact mode. The density of protrusions equal to or greater than 50 nm in height on the backcoat layer surface as measured by contact needle-type three-dimensional surface roughness meter refers to a value obtained by measuring an area of 1,500×500 micrometers with a Surf Coder SE3500 surface roughness meter made by Kosaka Laboratory, Ltd., for example.

The surface properties of the backcoat layer can be controlled through: (1) the particle diameter and quantity of the granular material added to the backcoat layer, (2) the method of preparing the backcoat layer coating liquid, and (3) the support surface properties. Examples of (1) above are employing microgranular carbon black and coarse granular carbon black in combination and adjusting the particle diameter and quantity of carbon black that is added. Examples of (2) above are adding carbon black of relatively narrow particle diameter distribution to the backcoat layer coating liquid, adjusting the dispersion conditions of the backcoat layer coating liquid, and employing a filter of suitable pore size to filter the backcoat layer coating liquid. (1) and (2) above will be described in detail further below. An example of (3) above is using a nonmagnetic support in which the density of protrusions equal to or greater than 50 nm in height on the surface on the backcoat layer side as measured by a contact needle-type three-dimensional surface roughness meter is, for example, 1 to 150/mm$^2$, preferably 5 to 130/mm$^2$, and more preferably, 20 to 110/mm$^2$. Controlling the particle diameter of the microgranular carbon black of (1) above is a suitable method for controlling the average surface roughness of the backcoat layer surface as measured by AFM. Controlling the particle diameter and quantity of coarse carbon black added of (1) above and controlling the pore size of the filter used to filter the backcoat coating liquid of (2) above are suitable methods of controlling the density of protrusions equal to or greater than 50 nm in height on the backcoat layer surface as measured by contact needle-type three-dimensional surface roughness meter.

Controlling the surface properties of the backcoat layer as set forth above permits a reduction in the number of indentations causing dropout of the magnetic layer surface. In the magnetic recording medium of the present invention, the number of indentations with a depth of equal to or greater than 30 nm on the surface of the magnetic layer surface as measured by AFM is preferably equal to or less than 100, more preferably equal to or less than 80, and further preferably, equal to or less than 60, per 40 micrometer square (40×40 micrometers). The smaller the number of indentations the better, with, ideally, 0 indentations being optimal. However, in practice, the lower limit can be 5, for example. The number of indentations on the magnetic layer surface can also be reduced by conducting a heat treatment to reduce the indentations in the stock material of the magnetic recording medium. The details are described in Japanese Unexamined Patent Publication (KOKAI) No. 2007-4874, which is expressly incorporated herein by reference in its entirety.

The magnetic recording medium of the present invention will be described in greater detail below.

Magnetic Layer

Ferromagnetic metal powder and hexagonal ferrite powder can be employed as the ferromagnetic powder in the magnetic layer. Details thereof will be described below. However, the ferromagnetic powder employed in the present invention is not limited to the ferromagnetic metal powder and hexagonal ferrite powder. For example, nitriding iron powders and the like may be employed.

(i) Ferromagnetic Metal Powder

The ferromagnetic metal powder employed in the magnetic layer is not specifically limited, but preferably a ferromagnetic metal power comprised primarily of α-Fe. In addition to prescribed atoms, the following atoms can be contained in the ferromagnetic metal powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and the like. Particularly, incorporation of at least one of the following in addition to α-Fe is desirable: Al, Si, Ca, Y, Ba, La, Nd, Co, Ni, and B. Incorporation of at least one selected from the group consisting of Co, Y and Al is particularly preferred. The Co content preferably ranges from 0 to 40 atom percent, more preferably from 15 to 35 atom percent, further preferably from 20 to 35 atom percent with respect to Fe. The content of Y preferably ranges from 1.5 to 12 atom percent, more preferably from 3 to 10 atom percent, further preferably from 4 to 9 atom percent with respect to Fe. The Al content preferably ranges from 1.5 to 12 atom percent, more preferably from 3 to 10 atom percent, further preferably from 4 to 9 atom percent with respect to Fe.

These ferromagnetic metal powders may be pretreated prior to dispersion with dispersing agents, lubricants, surfactants, antistatic agents, and the like, described further below. Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307, and 46-39639; and U.S. Pat. Nos. 3,026,215, 3,031,341, 3,100, 194, 3,242,005, and 3,389,014, which are expressly incorporated herein by reference in their entirety.

The ferromagnetic metal powder may contain a small quantity of hydroxide or oxide. Ferromagnetic metal powders obtained by known manufacturing methods may be employed. The following are examples of methods of manufacturing ferromagnetic metal powders: methods of reduction with compound organic acid salts (chiefly oxalates) and reducing gases such as hydrogen; methods of reducing iron oxide with a reducing gas such as hydrogen to obtain Fe or Fe—Co particles or the like; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining powder by vaporizing a metal in a low-pressure inert gas. Any one from among the known method of slow oxidation, that is, immersing the ferromagnetic metal powder thus obtained in an organic solvent and drying it; the method of immersing the ferromagnetic metal powder in an organic solvent, feeding in an oxygen-containing gas to form a surface oxide film, and then conducting drying; and the method of adjusting the partial pressures of oxygen gas and an inert gas without employing an organic solvent to form a surface oxide film, may be employed.

The specific surface area by BET method of the ferromagnetic metal powder employed in the magnetic layer is preferably 45 to 100 m$^2$/g, more preferably 50 to 80 m$^2$/g. At 45 m$^2$/g and above, low noise is achieved. At 100 m$^2$/g and below, good surface properties are achieved. The crystallite size of the ferromagnetic metal powder is preferably 80 to 180 Angstroms, more preferably 100 to 180 Angstroms, and still more preferably, 110 to 175 Angstroms. The major axis length of the ferromagnetic metal powder is preferably equal to or greater than 10 nm and equal to or less than 150 nm, more preferably equal to or greater than 20 nm and equal to or less than 150 nm, and still more preferably, equal to or greater than 30 nm and equal to or less than 120 nm. The acicular ratio of the ferromagnetic metal powder is preferably equal to or greater than 3 and equal to or less than 15, more preferably equal to or greater than 5 and equal to or less than 12. The $\sigma_s$ of the ferromagnetic metal powder is preferably 100 to 180 A·m$^2$/kg, more preferably 110 to 170 A·m$^2$/kg, and still more preferably, 125 to 160 A·m$^2$/kg. The coercivity of the ferromagnetic powder is preferably 2,000 to 3,500 Oe, approximately 160 to 280 kA/m, more preferably 2,200 to 3,000 Oe, approximately 176 to 240 kA/m.

The moisture content of the ferromagnetic metal powder is desirably 0.01 to 2 percent. The moisture content of the ferromagnetic metal powder is desirably optimized based on the type of binder. The pH of the ferromagnetic metal powder is desirably optimized depending on what is combined with the binder. A range of 4 to 12 can be established, with 6 to 10 being preferred. As needed, the ferromagnetic metal powder can be surface treated with Al, Si, P, or an oxide thereof. The quantity can be set to 0.1 to 10 weight percent of the ferromagnetic metal powder. When applying a surface treatment, the quantity of a lubricant such as a fatty acid that is adsorbed is desirably not greater than 100 mg/m$^2$. The ferromagnetic metal powder will sometimes contain inorganic ions such as soluble Na, Ca, Fe, Ni, or Sr. These are desirably substantially not present, but seldom affect characteristics at equal to or less than 200 ppm. The ferromagnetic metal powder employed in the present invention desirably has few voids;

the level is preferably equal to or less than 20 volume percent, more preferably equal to or less than 5 volume percent. As stated above, so long as the particle size characteristics are satisfied, the ferromagnetic metal powder may be acicular, rice grain-shaped, or spindle-shaped. The SFD of the ferromagnetic metal powder itself is desirably low, with equal to or less than 0.8 being preferred. The Hc distribution of the ferromagnetic metal powder is desirably kept low. When the SFD is equal to or lower than 0.8, good electromagnetic characteristics are achieved, output is high, and magnetic inversion is sharp, with little peak shifting, in a manner suited to high-density digital magnetic recording. To keep the Hc low, the methods of improving the particle size distribution of goethite in the ferromagnetic metal powder and preventing sintering may be employed.

(ii) Hexagonal Ferrite Powder

Examples of hexagonal ferrite powders are barium ferrite, strontium ferrite, lead ferrite, calcium ferrite, and various substitution products thereof such as Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated into the hexagonal ferrite powder in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed.

When the length of the signal recording region approaches the size of the magnetic material contained in the magnetic layer, it becomes impossible to create a distinct magnetization transition state, essentially precluding recording. Thus, the shorter the recording wavelength becomes, the smaller the magnetic material should be. In the present invention, to achieve good recording in the short-wavelength region, the use of hexagonal ferrite powder having a mean plate diameter falling within a range of 10 to 40 nm is preferable, a range of 15 to 30 nm is more preferable, and a range of 20 to 25 nm is of still greater preference.

An average plate ratio [arithmetic average of (plate diameter/plate thickness)] preferably ranges from 1 to 15, more preferably 1 to 7. When the average plate diameter ranges from 1 to 15, adequate orientation can be achieved while maintaining high filling property as well as increased noise due to stacking between particles can be suppressed. The specific surface area by BET method ($S_{BET}$) within the above particle size range is preferably equal to or higher than 40 m$^2$/g, more preferably 40 to 200 m$^2$/g, and particularly preferably, 60 to 100 m$^2$/g.

Narrow distributions of particle plate diameter and plate thickness of the hexagonal ferrite powder are normally good. About 500 particles can be randomly measured in a transmission electron microscope (TEM) photograph of particles to measure the particle plate diameter and plate thickness. The distributions of particle plate diameter and plate thickness are often not a normal distribution. However, when expressed as the standard deviation to the average size, σ/average size may be 0.1 to 1.0. The particle producing reaction system is rendered as uniform as possible and the particles produced are subjected to a distribution-enhancing treatment to achieve a narrow particle size distribution. For example, methods such as selectively dissolving ultrafine particles in an acid solution by dissolution are known.

A coercivity (Hc) of the hexagonal ferrite powder of about 143.3 to 318.5 kA/m (approximately 1800 to 4,000 Oe) can normally be achieved. The coercivity (Hc) of the hexagonal ferrite powder preferably ranges from 159.2 to 238.9 kA/m (approximately 2,000 to 3,000 Oe), more preferably 191.0 to 214.9 kA/m (approximately 2,200 to 2,800 Oe). The coercivity (Hc) can be controlled by particle size (plate diameter and plate thickness), the types and quantities of elements contained, substitution sites of the element, the particle producing reaction conditions, and the like.

The saturation magnetization ($\sigma_s$) of the hexagonal ferrite powder can be 30 to 80 A·m$^2$/kg (30 to 80 emu/g). The higher saturation magnetization ($\sigma_s$) is preferred, however, it tends to decrease with decreasing particle size. Known methods of improving saturation magnetization ($\sigma_s$) are combining spinel ferrite with magnetoplumbite ferrite, selection of the type and quantity of elements incorporated, and the like. It is also possible to employ W-type hexagonal ferrite. When dispersing the hexagonal ferrite powder, the surface of the hexagonal ferrite powder can be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added can range from 0.1 to 10 weight percent relative to the weight of the hexagonal ferrite powder. The pH of the hexagonal ferrite powder is also important to dispersion. A pH of about 4 to 12 is usually optimum for the dispersion medium and polymer. From the perspective of the chemical stability and storage properties of the medium, a pH of about 6 to 11 can be selected. Moisture contained in the hexagonal ferrite powder also affects dispersion. There is an optimum level for the dispersion medium and polymer, usually selected from the range of 0.01 to 2.0 weight percent.

Methods of manufacturing the hexagonal ferrite powder include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to equal to or greater than 100° C.; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. Any manufacturing method can be selected in the present invention. As needed, the hexagonal ferrite powder can be surface treated with Al, Si, P, or an oxide thereof. The quantity can be set to 0.1 to 10 weight percent of the hexagonal ferrite powder. When applying a surface treatment, the quantity of a lubricant such as a fatty acid that is adsorbed is desirably not greater than 100 mg/m$^2$. The hexagonal ferrite powder will sometimes contain inorganic ions such as soluble Na, Ca, Fe, Ni, or Sr. These are desirably substantially not present, but seldom affect characteristics at equal to or less than 200 ppm.

Known techniques regarding binders, lubricants, dispersion agents, additives, solvents, dispersion methods and the like for magnetic layer, nonmagnetic layer and backcoat layer can be suitably applied. In particular, known techniques regarding the quantity and types of binders, and quantity added and types of additives and dispersion agents can be applied.

Binder

Conventionally known thermoplastic resins, thermosetting resins, reactive resins and mixtures thereof may be employed as binders used. The thermoplastic resins suitable for use have a glass transition temperature of −100 to 150° C., a number average molecular weight of 1,000 to 200,000, preferably from 10,000 to 100,000, and have a degree of polymerization of about 50 to 1,000. By employing a thermosetting resin in a nonmagnetic layer and conducting a thermal treatment, it is possible to improve resistance to solvent of nonmagnetic layer and reduce roughness on a boundary surface between the magnetic layer and the nonmagnetic layer, permitting control of surface glossiness.

Examples thereof are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in *Handbook of Plastics* published by Asakura Shoten, which is expressly incorporated herein by reference in its entirety. It is also possible to employ known electron beam-cured resins in each layer. Examples and manufacturing methods of such resins are described in Japanese Unexamined Patent Publication (KOKAI) Showa No. 62-256219, which is expressly incorporated herein by reference in its entirety. The above-listed resins may be used singly or in combination. Preferred resins are combinations of polyurethane resin and at least one member selected from the group consisting of vinyl chloride resin, vinyl chloride—vinyl acetate copolymers, vinyl chloride—vinyl acetate—vinyl alcohol copolymers, and vinyl chloride—vinyl acetate—maleic anhydride copolymers, as well as combinations of the same with polyisocyanate.

Known polyurethane resins may be employed, such as polyester polyurethane, polyether polyurethane, polyether polyester polyurethane, polycarbonate polyurethane, polyester polycarbonate polyurethane, and polycaprolactone polyurethane. A binder obtained by incorporating as needed one or more polar groups selected from among —COOM, —$SO_3M$, —$OSO_3M$, —P═O(OM)$_2$, and —O—P═O (OM)$_2$ (where M denotes a hydrogen atom or an alkali metal base), —OH, —NR$_2$, —N$^+$R$_3$ (where R denotes a hydrocarbon group), epoxy group, —SH, and —CN into any of the above-listed binders by copolymerization or addition reaction to improve dispersion properties and durability is desirably employed. The quantity of such a polar group ranges from $10^{-1}$ to $10^{-8}$ mol/g, preferably from $10^{-2}$ to $10^{-6}$ mol/g.

Specific examples of the binders are VAGH, VYHH, VMCH, VAGF, VAGD, VROH, VYES, VYNC, VMCC, XYHL, XYSCI, PKHH, PKHJ, PKHC, and PKFE from Dow Chemical Company; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo-Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The quantity of binder added to the magnetic layer and the nom-nagnetic layer ranges from, for example, 5 to 50 weight percent, preferably from 10 to 30 weight percent, relative to the weight of the nonmagnetic powder or magnetic powder. When employing vinyl chloride resin, the quantity of binder added is preferably from 5 to 30 weight percent; when employing polyurethane resin, from 2 to 20 weight percent; and when employing polyisocyanate, from 2 to 20 weight percent. They may be employed in combination. However, for example, when head corrosion occurs due to the release of trace amounts of chlorine, polyurethane alone or just polyurethane and isocyanate may be employed. When polyurethane is employed, the glass transition temperature ranges from, for example, −50 to 150° C., preferably from 0 to 100° C.; the elongation at break preferably ranges from 100 to 2,000 percent; the stress at break desirably ranges from 0.05 to 10 kg/mm$^2$ (approximately 0.49 to 98 MPa); and the yield point preferably ranges from 0.05 to 10 kg/mm$^2$ (approximately 0.49 to 98 MPa).

Examples of polyisocyanates are tolylene diisocyanate, 4,4'-diphenyhnethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co., Ltd.; and Desmodule L, Desmodule IL, Desmodule N and Desmodule HL manufactured by Sumitomo Bayer Co., Ltd. They can be used in each layer singly or in combinations of two or more by exploiting differences in curing reactivity.

Additives may be added to the magnetic layer as needed. Examples of such additives are: abrasives, lubricants, dispersing agents, dispersing adjuvants, antifungal agents, antistatic agents, oxidation inhibitors, solvents, and carbon black. Examples of additives are: molybdenum disulfide, tungsten disulfide, graphite, boron nitride, graphite fluoride, silicone oil, polar group-comprising silicone, fatty acid-modified silicone, fluorosilicone, fluoroalcohols, fluoroesters, polyolefin, polyglycol, polyphenyl ether, phenyl phosphonic acid, benzyl phosphonic acid, phenethyl phosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, nonylphenylphosphonic acid, other aromatic ring-comprising organic phosphonic acids, alkali metal salts thereof, octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, isoeicosylphosphonic acid, other alkyl phosphonoic acid, alkali metal salts thereof, phenyl phosphoric acid, benzyl phosphoric acid, phenethyl phosphoric acid, α-methylbenzylphosphoric acid, 1-methyl-1-phenethylphosphoric acid, diphenylmethylphosphoric acid, diphenyl phosphoric acid, benzylphenyl phosphoric acid, α-cumyl phosphoric acid, toluyl phosphoric acid, xylyl phosphoric acid, ethylphenyl phosphoric acid, cumenyl phosphoric acid, propylphenyl phosphoric acid, butylphenyl phosphoric acid, heptylphenyl phosphoric acid, octylphenyl phosphoric acid, nonylphenyl phosphoric acid, other aromatic phosphoric esters, alkali metal salts thereof, octyl phosphoric acid, 2-ethylhexylphosphoric acid, isooctyl phosphoric acid, isononyl phosphoric acid, isodecyl phosphoric acid, isoundecyl phosphoric acid, isododecyl phosphoric acid, isohexadecyl phosphoric acid, isooctyldecyl phosphoric acid, isoeicosyl phosphoric acid, other alkyl ester phosphoric acids, alkali metal salts thereof, alkylsulfonic acid ester, alkali metal salts thereof, fluorine-containing alkyl sulfuric acid esters, alkali metal salts thereof, lauric acid, myristic acid, palmitic acid, stearic acid, behenic acid, oleic acid, linolic acid, linoleic acid, elaidic acid, erucic acid, other monobasic fatty. acids comprising 10 to 24 carbon atoms. (which may contain an unsaturated bond or be branched), metal salts thereof, butyl stearate, octyl stearate, amyl stearate, isooctyl stearate, octyl myristate, butyl laurate, butoxyethyl stearate, anhydrosorbitan monostearate, anhydrosorbitan tristearate, other monofatty esters, difatty esters, or polyfatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 22 carbon atoms (which may contain an unsaturated bond or be branched), alkoxyalcohol having 12 to 22 carbon atoms (which may contain an unsaturated bond or be branched) or a monoalkyl ether of an alkylene oxide polymer, fatty acid amides with 2 to 22 carbon atoms, and aliphatic amines with 8 to 22 carbon atoms. Compounds having aralkyl groups, aryl groups, or alkyl groups substituted with groups other than hydrocarbon groups, such as nitro groups, F, Cl, Br, $CF_3$, $CCl_3$, $CBr_3$, and other halogen-containing hydrocarbons in addition to the above hydrocarbon groups, may also be employed.

It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in A *Guide to Surfactants* (published by Sangyo Tosho K.K.), which is expressly incorporated herein by reference in its entirety.

These lubricants, antistatic agents and the like need not be 100 percent pure and may contain impurities, such as isomers, unreacted material, by-products, decomposition products, and oxides in addition to the main components. These impurities are preferably comprised equal to or less than 30 weight percent, and more preferably equal to or less than 10 weight percent.

Specific examples of these additives are: NAA-102, hydrogenated castor oil fatty acid, NAA-42, Cation SA, Nymeen L-201, Nonion E-208, Anon BF and Anon LG manufactured by NOF Corporation; FAL-205 and FAL-123 manufactured by Takemoto Oil & Fat Co.,Ltd.; NJLUB OL manufactured by New Japan Chemical Co.Ltd.; TA-3 manufactured by Shin-Etsu Chemical Co.Ltd.; Armide P and Duomine TDO manufactured by Lion Corporation; BA-41G manufactured by Nisshin OilliO, Ltd.; and Profan 2012E, Newpole PE61 and Ionet MS-400 manufactured by Sanyo Chemical Industries, Ltd.

Carbon black may be added to the magnetic layer as needed. Examples of types of carbon black that are suitable for use in the magnetic layer are: furnace black for rubber, thermal for rubber, black for coloring, and acetylene black. It is preferable that the specific surface area is 5 to 500 $m^2/g$, the DBP oil absorption capacity is 10 to 400 ml/100 g, the particle diameter is 5 to 300 nm, the pH is 2 to 10, the moisture content is 0.1 to 10 percent, and the tap density is 0.1 to 1 g/ml.

Specific examples of types of carbon black employed are: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Ketjen Black International Co., Ltd. The carbon black employed may be surface-treated with a dispersant or grafted with resin, or have a partially graphite-treated surface. The carbon black may be dispersed in advance into the binder prior to addition to the magnetic coating liquid. These carbon blacks may be used singly or in combination. When employing carbon black, the quantity preferably ranges from 0.1 to 30 weight percent with respect to the weight of the ferromagnetic powder. In the magnetic layer, carbon black can work to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the magnetic layer and the nonmagnetic layer based on the objective and the various characteristics stated above, such as particle size, oil absorption capacity, electrical conductivity, and pH, and be optimized for each layer. For example, the *Carbon Black Handbook* compiled by the Carbon Black Association, which is expressly incorporated herein by reference in its entirety, may be consulted for types of carbon black suitable for use in the magnetic layer.

Abrasive

Known materials chiefly having a Mohs' hardness of equal to or greater than 6 may be employed either singly or in combination as abrasives. These include: α-alumina with an α-conversion rate of equal to or greater than 90 percent, β-alumina, silicon carbide, chromium oxide, cerium oxide, α-iron oxide, corundum, synthetic diamond, silicon nitride, titanium carbide, titanium oxide, silicon dioxide, and boron nitride. Complexes of these abrasives (obtained by surface treating one abrasive with another) may also be employed. There are cases in which compounds or elements other than the primary compound are contained in these abrasives; the effect does not change so long as the content of the primary compound is equal to or greater than 90 percent. The particle size of the abrasive is preferably 0.01 to 2 micrometers. To enhance electromagnetic characteristics, a narrow particle size distribution is desirable. Abrasives of differing particle size may be incorporated as needed to improve durability; the same effect can be achieved with a single abrasive as with a wide particle size distribution. It is preferable that the tap density is 0.3 to 2 g/cc, the moisture content is 0.1 to 5 percent, the pH is 2 to 11, and the specific surface area is 1 to 30 m$^2$/g. The shape of the abrasive employed may be acicular, spherical, cubic, plate-shaped or the like. However, a shape comprising an angular portion is desirable due to high abrasiveness. Specific examples are AKP-12, AKP-15, AKP-20, AKP-30, AKP-50, HIT-20, HIT-30, HIT-55, HIT-60, HIT-70, HIT-80, and HIT-100 made by Sumitomo Chemical Co.,Ltd.; ERC-DBM, HP-DBM, and HPS-DBM made by Reynolds Corp.; WA10000 made by Fujimi Abrasive Corp.; UB20 made by Uemura Kogyo Corp.; G-5, Chromex U2, and Chromex U1 made by Nippon Chemical Industrial Co., Ltd.; TF100 and TF140 made by Toda Kogyo Corp.; Beta Random Ultrafine made by Ibiden Co., Ltd.; and B-3 made by Showa Kogyo Co., Ltd. These abrasives may be added as needed to the nonmagnetic layer. Addition of abrasives to the nonmagnetic layer can be done to control surface shape, control how the abrasive protrudes, and the like. The particle size and quantity of the abrasives added to the magnetic layer and nonmagnetic layer should be set to optimal values.

Known organic solvents can be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane.

These organic solvents need not be 100 weight percent pure and may contain impurities such as isomers, unreacted materials, by-products, decomposition products, oxides and moisture in addition to the main components. The content of these impurities is preferably equal to or less than 30 weight percent, more preferably equal to or less than 10 weight percent. Preferably the same type of organic solvent is employed in the magnetic layer and in the nonmagnetic layer. However, the amount added may be varied. The stability of coating is increased by using a solvent with a high surface tension (such as cyclohexanone or dioxane) in the nonmagnetic layer. Specifically, it is important that the arithmetic mean value of the magnetic layer solvent composition be not less than the arithmetic mean value of the nonmagnetic layer solvent composition. To improve dispersion properties, a solvent having a somewhat strong polarity is desirable. It is desirable that solvents having a dielectric constant equal to or higher than 15 are comprised equal to or higher than 50 percent of the solvent composition. Further, the dissolution parameter is desirably 8 to 11.

The types and quantities of dispersing agents, lubricants, and surfactants employed in the magnetic layer may differ from those employed in the nonmagnetic layer, described further below, in the present invention. For example (the present invention not being limited to the embodiments given herein), a dispersing agent usually has the property of adsorbing or bonding by means of a polar group. In the magnetic layer, the dispersing agent adsorbs or bonds by means of the polar group primarily to the surface of the ferromagnetic metal powder, and in the nonmagnetic layer, primarily to the surface of the nonmagnetic powder. It is surmised that once an organic phosphorus compound has adsorbed or bonded, it tends not to dislodge readily from the surface of a metal, metal compound, or the like. Accordingly, the surface of a ferromagnetic metal powder or the surface of a nonmagnetic powder becomes covered with the alkyl group, aromatic groups, and the like. This enhances the compatibility of the ferromagnetic metal powder or nonmagnetic powder with the binder resin component, further improving the dispersion stability of the ferromagnetic metal powder or nonmagnetic powder. Further, lubricants are normally present in a free state. Thus, it is conceivable to use fatty acids with different melting points in the nonmagnetic layer and magnetic layer to control seepage onto the surface, employ esters with different boiling points and polarity to control seepage onto the surface, regulate the quantity of the surfactant to enhance coating stability, and employ a large quantity of lubricant in the nonmagnetic layer to enhance the lubricating effect. All or some part of the additives employed in the present invention can be added in any of the steps during the manufacturing of coating liquids for the magnetic layer and nonmagnetic layer. For example, there are cases where they are mixed with the ferromagnetic powder prior to the kneading step; cases where they are added during the step in which the ferromagnetic powder, binder, and solvent are kneaded; cases where they are added during the dispersion step; cases where they are added after dispersion; and cases where they are added directly before coating.

Nonmagnetic Layer

Details of the nonmagnetic layer will be described below. The magnetic recording medium of the present invention may comprise a nonmagnetic layer comprising a nonmagnetic powder and a binder between the nonmagnetic support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides.

Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped. The crystallite size of the nonmagnetic powder preferably ranges from 4 nm to 500 nm, more preferably from 40 to 100 nm. A crystallite size falling within a range of 4 nm to 500nm is desirable in that it facilitates dispersion and imparts a suitable surface roughness. The average particle diameter of the nonmagnetic powder preferably ranges from 5 nm to 500 nm. As needed, nonmagnetic powders of differing average particle diameter may be combined; the same effect may be achieved by broadening the average particle distribution of a single nonmagnetic powder. The preferred average particle diameter of the nonmagnetic powder ranges from 10 to 200 um. Within a range of 5 nm to 500nm, dispersion is good and good surface roughness can be achieved.

The specific surface area of the nonmagnetic powder preferably ranges from 1 to 150 m$^2$/g, more preferably from 20 to 120 m$^2$/g, and further preferably from 50 to 100 m$^2$/g. Within the specific surface area ranging from 1 to 150 m$^2$/g, suitable surface roughness can be achieved and dispersion is possible with the desired quantity of binder. Oil absorption capacity using dibutyl phthalate (DBP) preferably ranges from 5 to 100 mL/100 g, more preferably from 10 to 80 mL/100 g, and further preferably from 20 to 60 mL/100 g. The specific gravity ranges from, for example, 1 to 12, preferably from 3 to 6. The tap density ranges from, for example, 0.05 to 2 g/mL, preferably from 0.2 to 1.5 g/mL. A tap density falling within a range of 0.05 to 2 g/mL can reduce the amount of scattering particles, thereby facilitating handling, and tends to prevent solidification to the device. The pH of the nonmagnetic powder preferably ranges from 2 to 11, more preferably from 6 to 9. When the pH falls within a range of 2 to 11, the coefficient of friction does not become high at high temperature or high humidity or due to the freeing of fatty acids. The moisture content of the nonmagnetic powder ranges from, for example, 0.1 to 5 weight percent, preferably from 0.2 to 3 weight percent, and more preferably from 0.3 to 1.5 weight percent. A moisture content falling within a range of 0.1 to 5 weight percent is desirable because it can produce good dispersion and yield a stable coating viscosity following dispersion. An ignition loss of equal to or less than 20 weight percent is desirable and nonmagnetic powders with low ignition losses are desirable.

When the nonmagnetic powder is an inorganic powder, the Mohs' hardness is preferably 4 to 10. Durability can be ensured if the Mohs' hardness ranges from 4 to 10. The stearic acid (SA) adsorption capacity of the nonmagnetic powder preferably ranges from 1 to 20 μmol/m$^2$, more preferably from 2 to 15 μmol/m$^2$. The heat of wetting in 25° C. water of the nonmagnetic powder is preferably within a range of 200 to 600 erg/cm$^2$ (approximately 200 to 600 mJ/m$^2$). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9. The surface of these nonmagnetic powders is preferably treated with $Al_2O_3$, $SiO_2$, $TiO_2$, $ZrO_2$, $SnO_2$, $Sb_2O_3$, and ZnO. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. They may be employed singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the nonmagnetic layer in the present invention are: Nanotite from Showa Denko K. K.; HIT-100 and ZA-G1 from Sumitomo Chemical Co., Ltd.; DPN-250, DPN-250BX, DPN-245, DPN-270BX, DPN-550BX and DPN-550RX from Toda Kogyo Corp.; titanium oxide TTO-51B, TTO-55A, TTO-55B, TTO-55C, TTO-55S, TTO-55D, SN-100, MJ-7, α-iron oxide E270, E271 and E300 from Ishihara Sangyo Co., Ltd.; STT-4D, STT-30D, STT-30 and STT-65C from Titan Kogyo K. K.; MT-100S, MT-100T, MT-150W, MT-500B, MT-600B, MT-100F and MT-500HD from Tayca Corporation; FINEX-25, BF-1, BF-10, BF-20 and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; Y-LOP from Titan Kogyo K. K.; and sintered products of the same. Particular preferable nonmagnetic powders are titanium dioxide and α-iron oxide.

Carbon black may be combined with nonmagnetic powder in the nonmagnetic layer to reduce surface resistivity, reduce light transmittance, and achieve a desired micro-Vickers hardness. The micro-Vickers hardness of the nonmagnetic layer is normally 25 to 60 kg/mm$^2$ (approximately 245 to 588 MPa), desirably 30 to 50 kg/mm$^2$ (approximately 294 to 490 MPa) to adjust head contact. It can be measured with a thin film hardness meter (HMA-400 made by NEC Corporation) using a diamond triangular needle with a tip radius of 0.1 micrometer and an edge angle of 80 degrees as indenter tip. "Techniques for evaluating thin-film mechanical characteristics," Realize Corp., for details. The content of the above publication is expressly incorporated herein by reference in its entirety. The light transmittance is generally standardized to an infrared absorbance at a wavelength of about 900 nm equal to or less than 3 percent. For example, in VHS magnetic tapes, it has been standardized to equal to or less than 0.8 percent. To this end, furnace black for rubber, thermal black for rubber, black for coloring, acetylene black and the like may be employed.

The specific surface area of the carbon black employed in the nonmagnetic layer is, for example, 100 to 500 m$^2$/g, preferably 150 to 400 m$^2$/g. The DBP oil absorption capability is, for example, 20 to 400 mL/100 g, preferably 30 to 200 mL/100 g. The particle diameter of the carbon black is, for example, 5 to 80 nm, preferably 10 to 50 nm, and more preferably, 10 to 40 nm. It is preferable that the pH of the carbon black is 2 to 10, the moisture content is 0.1 to 10 percent, and the tap density is 0.1 to 1 g/mL.

Specific examples of types of carbon black employed in the nonmagnetic layer are: BLACK PEARLS 2000, 1300, 1000, 900, 905, 800, 880, 700 and VULCAN XC-72 from Cabot Corporation; #3050B, #3150B, #3250B, #3750B, #3950B, #950, #650B, #970B, #850B and MA-600 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Ketjen Black International Co., Ltd.

The carbon black employed may be surface-treated with a dispersant or grafted with resin, or have a partially graphite-reated surface. The carbon black may be dispersed in advance into the binder prior to addition to the nonmagnetic coating liquid. These carbon blacks may be used singly or in combination. When employing carbon black, the quantity of the carbon black is preferably within a range not exceeding 50 weight percent of the inorganic powder as well as not exceeding 40 weight percent of the-total weight of the nonmagnetic layer. For example, the *Carbon Black Handbook* compiled by the Carbon Black Association, which is expressly incorporated herein by reference in its entirety, may be consulted for types of carbon black suitable for use in the nonmagnetic layer.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above applications are expressly incorporated herein by reference in their entirety.

Binders, lubricants, dispersing agents, additives, solvents, dispersion methods, and the like suited to the magnetic layer may be adopted to the nonmagnetic layer. In particular, known techniques for the quantity and type of binder and the quantity and type of additives and dispersion agents employed in the magnetic layer may be adopted thereto.

Backcoat Layer

The magnetic recording medium of the present invention comprises a backcoat layer on the opposite surface of the nonmagnetic support from the surface on which the magnetic layer is present. The backcoat layer comprises a granular material and a binder. Generally, in magnetic tapes for use in recording computer data, repeat running property is required more than in audio and video tapes. To maintain such high running durability, granular materials in the form of carbon black and inorganic powder are desirably incorporated into the backcoat layer.

Two types of carbon black of differing average particle diameter are desirably employed in combination. In this case, microgranular carbon black with an average particle diameter of 10 to 50 nm and coarse granular carbon black with an average particle diameter of 70 to 130 nm are desirably employed in combination. Using carbon blacks of differing particle diameter in this manner makes it possible to control the surface roughness and number of protrusions of the backcoat layer. Generally, the addition of the above-described microgranular carbon black makes it possible to set a low surface resistivity and low light transmittance in the backcoat layer. Some magnetic recording devices employ the light transmittance of the tape, often for operating signals. Thus, in such cases, the addition of microgranular carbon black is particularly effective. Microgranular carbon black generally has a good ability to retain liquid lubricant, and when employed in combination with a liquid lubricant, contributes to reducing the frictional coefficient. Additionally, coarse granular carbon black with an average particle diameter of 70 to 130 nm can function as a solid lubricant, form microprotrusions on the surface of the back layer, reduce the contact area, and contribute to reducing the frictional coefficient. However, when coarse granular carbon black is employed alone, it tends to drop out of the backcoat layer due to tape sliding in severe running systems, sometimes increasing the error rate. In the present invention, the carbon black employed in the backcoat layer is desirably selected in consideration of the above factors.

Examples of specific microparticulate carbon black products are given below and the mean particle diameter is given in parentheses: RAVEN200B (18 nm), RAVEN1500B (17 nm), RAVEN1255 (23 nm), RAVEN1000 (28 nm), RAVEN850 (31 nm) (manufactured by Columbia Carbon Co., Ltd.), BP800 (17 nm), BP3500 (40 nm), BP280 (45 nm), REGAL99 (38 nm) (manufactured by Cabot Corporation), PRINNTEX90 (14 nm), PRINTEX95 (15 nm), PRINTEX85 (16 nm), PRINTEX75 (17 nm) (the above products are manufactured by Degusa Co.), #950 (16 nm), #650B (22 nm), #95 (40 nm) (manufactured by Mitsubishi chemical industry Co., Ltd.), and #90 (19 nm), #70 (28 nm), #60 (45 nm) (manufactured by Asahi Carbon Co., Ltd.).

Specific products of coarse granular carbon black are given below; RAVEN410 (70 nm) (manufactured by Columbia Carbon Co., Ltd.), BP130 (75 nm) (manufactured by Cabot Corporation), #50 (80 nm), #35 (78 nm), #15 (122 nm), ASAHI THERMAL (80 nm) (manufactured by Asahi Carbon Co., Ltd.).

When two types of carbon black of differing mean particle diameter are employed in the backcoat layer, the content (by weight) of 10 to 50 nm microparticulate carbon black and 70 to 130 nm coarse carbon black preferably falls within a range of (former: latter) of 98:2 to 75:25, more preferably from 95:5 to 85:15.

The content of carbon black employed in the backcoat layer (the total content when employing two types) normally ranges from 60 to 120 weight parts and preferably ranges from 80 to 100 weight parts per 100 weight parts of binder.

The particle diameter of the carbon black is desirably regulated to control the number of protrusions on the surface of the backcoat layer. To reduce the number of protrusions exceeding 50 nm in height on the surface of the backcoat layer, the maximum particle diameter of the carbon black employed preferably does not exceed the film thickness of the backcoat layer, and more preferably does not exceed ½ the film thickness of the backcoat layer. The maximum particle diameter of the carbon black can be obtained by calculating the particle size distribution with an image analyzer from a photograph of the carbon black particles taken by transmission electron microscopy (TEM).

Two types of inorganic powder of differing hardness are desirably employed in combination. Specifically, a soft inorganic powder with a Mohs' hardness of 3 to 4.5 and a hard inorganic powder with a Mohs' hardness of 5 to 9 are desirably employed. Adding a soft inorganic powder with a Mohs' hardness of 3 to 4.5 can help stabilize the frictional coefficient resulting from repeat running. There may be no shaving of the sliding guide poles within this hardness range. The mean particle diameter of the inorganic powder desirably falls within a range of 30 to 50 nm.

Examples of soft inorganic powders with a Mohs' hardness of 3 to 4.5 are: calcium sulfate, calcium carbonate, calcium silicate, barium sulfate, magnesium carbonate, zinc carbonate, and zinc oxide. They may be employed singly or in combinations of two or more.

The content of soft inorganic powder in the backcoat layer preferably ranges from 10 to 140 weight parts, more preferably 35 to 100 weight parts, per 100 weight parts of carbon black.

The addition of a hard inorganic powder having a Mohs' hardness of 5 to 9 can strengthen the backcoat layer and enhance running durability. The use of such inorganic powder with carbon black and the above soft inorganic powder can reduce deterioration with repeat sliding and yield a strong backcoat layer. The addition of the inorganic powder can impart suitable abrasive strength and reduce the adhesion of shavings to the tape guide poles and the like. Particularly when employed in combination with a soft inorganic powder, the sliding property for rough surface guide poles can be enhanced and the frictional coefficient of the backcoat layer can be stabilized. The mean particle size of the hard inorganic powder preferably falls within a range of 80 to 250 nm (more preferably 100 to 210 nm).

Examples of hard inorganic powders with a Mohs' hardness of 5 to 9 are: $\alpha$-iron oxide, $\alpha$-alumnina, and chromium oxide ($Cr_2O_3$). These powders may be employed singly or in combination. Among these powders, $\alpha$-iron oxide and $\alpha$-alumina are desirable. The content of hard inorganic powder is normally 3 to 30 weight parts, desirably 3 to 20 weight parts, per 100 weight parts of carbon black.

When the above soft inorganic powder and hard inorganic powder are employed in combination in the backcoat layer, the soft inorganic powder and hard inorganic powder are desirably selected so that the difference in hardness between the two is equal to or more than 2 (preferably equal to or more than 2.5, and more preferably, equal to or more than 3). Two types of inorganic powders having the above-described specific mean particle sizes and two types of carbon black of the above-described differing mean particle sizes are desirably incorporated into the backcoat layer.

Lubricant can be incorporated into the backcoat layer. The lubricant can be suitably selected for use from among the lubricants given by way of example for lubricants suitable for use in the nonmagnetic layer or magnetic layer, as set forth above. The lubricant is normally added to the backcoat layer in a range of 1 to 5 weight parts per 100 weight parts of binder. The binder employed in the magnetic layer or nonmagnetic layer can be employed as binder in the backcoat layer.

Nonmagnetic Support

Known films of the following may be employed as the nonmagnetic support in the present invention: polyethylene terephthalate, polyethylene naphthalate and other polyesters, polyolefins, cellulose triacetate, polycarbonate, polyamides, polyimides, polyamidoimides, polysulfones, aromatic polyamides, polybenzooxazoles and the like. Supports having a glass transition temperature of equal to or higher than 100° C. are preferably employed. The use of polyethylene naphthalate, aramid, or some other high-strength support is particularly desirable. As needed, layered supports such as disclosed in Japanese Unexamined Patent Publication (KOKAI) Heisei No. 3-224127, which is expressly incorporated herein by reference in its entirety, may be employed to vary the surface roughness of the magnetic surface and support surface. These supports may be subjected beforehand to corona discharge treatment, plasma treatment, adhesion enhancing treatment, heat treatment, dust removal, and the like.

Suitable nonmagnetic supports are those having a number of protrusions equal to or greater than 50 nm in height on the surface on the backcoat layer side, as measured by a contact needle-type three-dimensional surface roughness meter, within the above-described range. The number of protrusions can be controlled by adjusting the particle diameter and/or quantity of fillers added to the nomnagnetic support.

The center surface average surface roughness (SRa) of the support measured with an optical interferotype surface roughness meter HD-2000 made by WYKO is preferably equal to or less than 8.0 nm, more preferably equal to or less than 4.0 nm, further preferably equal to or less than 2.0 nm. Not only does such a support desirably have a low center surface average surface roughness, but there are also desirably no large protrusions equal to or higher than 0.5 μm. The surface roughness shape may be freely controlled through the size and quantity of filler added to the support as needed. Examples of such fillers are oxides and carbonates of elements such as Ca, Si, and Ti, and organic fine powders such as acrylic-based one. The support desirably has a maximum height $R_{max}$ equal to or less than 1 μm, a ten-point average roughness $R_Z$ equal to or less than 0.5 μm, a center surface peak height $R_P$ equal to or less than 0.5 μm, a center surface valley depth $R_V$ equal to or less than 0.5 μm, a center-surface surface area percentage Sr of 10 percent to 90 percent, and an average wavelength $\lambda_a$ of 5 to 300 μm. To achieve desired electromagnetic characteristics and durability, the surface protrusion distribution of the support can be freely controlled with fillers. It is possible to control within a range from 0 to 2,000 protrusions of 0.01 to 1 μm in size per 0.1 mm².

The F-5 value of the nonmagnetic support employed in the present invention preferably ranges from 5 to 50 kg/mm² (approximately 49 to 490 MPa). The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 1 percent, more preferably equal to or less than 0.5 percent. The breaking strength of the nonmagnetic support preferably ranges from 5 to 100 kg/mm² (approximately 49 to 980 MPa). The modulus of elasticity preferably ranges from 100 to 2,000 kg/mm² (approximately 0.98 to 19.6 GPa). The thermal expansion coefficient preferably ranges from $10^{-4}$ to $10^{-8}$/° C., more preferably from $10^{-5}$ to $10^{-6}$/° C. The moisture expansion coefficient is preferably equal to or less than $10^{-4}$/RH percent, more preferably equal to or less than $10^{-5}$/RH percent. These thermal characteristics, dimensional characteristics, and mechanical strength characteristics are desirably nearly equal, with a difference equal to less than 10 percent, in all in-plane directions in the support.

An undercoating layer can be provided in the magnetic recording medium of the present invention. Providing an undercoating layer can enhance adhesive strength between the support and the magnetic layer or nonmagnetic layer. For example, a polyester resin that is soluble in solvent can be employed as the undercoating layer to enhance adhesion. As described below, a smoothing layer can be provided as an undercoating layer.

Layer structure

In the magnetic recording medium of the present invention, the thickness of the nonmagnetic support preferably ranges from 3 to 80 micrometers, more preferably from 3 to 50 micrometers, further preferably from 3 to 10 micrometers. When an undercoating layer is provided between the nonmagnetic support and the nonmagnetic layer or the magnetic layer, the thickness of the undercoating layer ranges from, for example, 0.01 to 0.8 micrometer, preferably 0.02 to 0.6 micrometer.

An intermediate layer can be provided between the support and the nonmagnetic layer or the magnetic layer and/or between the support and the backcoat layer to improve smoothness. For example, the intermediate layer can be formed by coating and drying a coating liquid comprising a polymer on the surface of the nonmagnetic support, or by coating a coating liquid comprising a compound (radiation-curable compound) comprising intramolecular radiation-curable functional groups and then irradiating it with radiation to cure the coating liquid.

A radiation-curable compound having a number average molecular weight ranging from 200 to 2,000 is desirably employed. When the molecular weight is within the above range, the relatively low molecular weight can facilitate coating flow during the calendering step, increasing moldability and permitting the formation of a smooth coating.

A radiation-curable compound in the form of a bifunctional acrylate compound with the molecular weight of 200 to 2,000 is desirable. Bisphenol A, bisphenol F, hydrogenated bisphenol A, hydrogenated bisphenol F, and compounds obtained by adding acrylic acid or methacrylic acid to alkylene oxide adducts of these compounds are preferred.

The radiation-curable compound can be used in combination with a polymeric binder. Examples of the binder employed in combination are conventionally known thermoplastic resins, thermosetting resins, reactive resins, and mixtures thereof. When the radiation employed in the curing process is UV radiation, a polymerization initiator is desirably employed in combination. A known photoradical polymerization initiator, photocationic polymerization initiator, photoamine generator, or the like can be employed as the polymerization initiator.

A radiation-curable compound can also be employed in the nonmagnetic layer.

The thickness of the magnetic layer can be optimized based on the saturation magnetization of the head employed, the length of the head gap, and the recording signal band, and is normally 10 to 150 nm, preferably 20 to 120 nm, more preferably 30 to 100 nm, and further preferably 30 to 80 nm. The thickness variation ($\sigma/\delta$) in the magnetic layer is preferably within ±50 percent, more preferably within ±30 percent. At least one magnetic layer is sufficient. The magnetic layer may be divided into two or more layers having different magnetic characteristics, and a known configuration relating to multi-layered magnetic layer may be applied.

The thickness of the nonmagnetic layer ranges from, for example, 0.1 to 3.0 µm, preferably 0.3 to 2.0 µm, and more preferably 0.5 to 1.5 µm. The nonmagnetic layer of the present invention is effective so long as it is substantially nonmagnetic. For example, it exhibits the effect of the present invention even when it comprises impurities or trace amounts of magnetic material that have been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT, or a coercive force Hc of equal to or less than 7.96 kA/m (100 Oe), it being preferable not to have a residual magnetic flux density or coercive force at all. The backcoat layer is preferably equal to or less than 0.9 micrometer, more preferably 0.1 to 0.7 micrometer, in thickness, to maintain the good running durability.

Manufacturing Method

The process for manufacturing coating liquids for forming magnetic, nonmagnetic and backcoat layers comprises at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads may be employed to disperse the coating liquids for magnetic, nonmagnetic and backcoat layers, with a dispersing medium with a high specific gravity such as zirconia beads, titania beads, and steel beads being suitable for use. The particle diameter and fill ratio of these dispersing media can be optimized for use. A known dispersing device may be employed. In manufacturing coating liquids, dispersion is preferably enhanced by controlling dispersion conditions (such as types and quantities of beads employed in dispersion, peripheral speed, and dispersion period).

Large particles are desirably removed from the backcoat layer coating liquid with a filter prior to coating. This reduces the number of large protrusions on the surface of the backcoat layer. The average pore size of the filter employed is desirably equivalent to or smaller than the thickness of the backcoat layer, with about 0.3 to 0.8 micrometer being suitable.

When coating a magnetic recording medium of multilayer configuration, both a wet-on-wet method (simultaneous multilayer coating method) and a wet-on-dry method (successive multilayer coating method) can be employed. In the wet-on-wet method, a coating liquid for forming a nonmagnetic layer is coated, and while this coating is still wet, a coating liquid for forming a magnetic layer is coated thereover and dried. In the wet-on-dry method, a coating liquid for forming a nonmagnetic layer is coated and dried to form a nonmagnetic layer, and then a coating liquid for forming a magnetic layer is coated on the nonmagnetic layer and dried. The successive coating method makes it possible to obtain a thinner, more uniform magnetic layer, and is thus a suitable coating method for high-density magnetic recording media.

When using the wet-on-wet method, the following methods are desirably employed;

(1) a method in which the nonmagnetic layer is first coated with a coating device commonly employed to coat magnetic coating materials such as a gravure coating, roll coating, blade coating, or extrusion coating device, and the magnetic layer is coated while the nonmagnetic layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672, which are expressly incorporated herein by reference in their entirety;

(2) a method in which the upper and lower layers are coated nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672, which are expressly incorporated herein by reference in their entirety; and (3) a method in which the upper and lower layers are coated nearly simultaneously using an extrusion coating apparatus with a backup roller as disclosed in Japanese Unexamined Patent Publication (KOKAI) Heisei No. 2-174965, which is expressly incorporated herein by reference in its entirety. To avoid deteriorating the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968, which are expressly incorporated herein by reference in their entirety. In addition, the viscosity of the coating liquid preferably satisfies the numerical range specified in Japanese Unexamined Patent Publication (KOKAI) Heisei No. 3-8471, which are expressly incorporated herein by reference in its entirety.

Coating of coating liquid for each layer can be carried out with a coating device commonly employed to coat magnetic coating materials such as a gravure coating, roll coating, blade coating, or extrusion coating device.

When the magnetic recording medium of the present invention is a magnetic tape, the coating layer that is formed by applying the magnetic layer coating liquid can be magnetic field orientation processed using cobalt magnets or solenoids on the ferromagnetic powder contained in the coating layer.

The drying position of the coating is desirably controlled by controlling the temperature and flow rate of drying air, and coating speed. A coating speed of 20 m/min to 1,000 m/min and a dry air temperature of equal to or higher than 60° C. are desirable. Suitable predrying can be conducted prior to entry into the magnet zone.

The coated stock material thus obtained can be temporarily wound on a take-up roll, and then unwound from the take-up roll and calendered.

For example, super calender rolls can be employed in calendering. Calendering can enhance surface smoothness, eliminate voids produced by the removal of solvent during drying, and increase the fill rate of the ferromagnetic powder in the magnetic layer, thus yielding a magnetic recording medium of good electromagnetic characteristics. The calendering step is desirably conducted by varying the calendering conditions in response to the smoothness of the surface of the coated stock material.

The glossiness of the coated stock material may decrease roughly from the center of the take-up roll toward the outside, and there is sometimes variation in the quality in the longitudinal direction. Glossiness is known to correlate (proportionally) to the surface roughness Ra. Accordingly, when the calendering conditions are not varied in the calendering step, such as by maintaining a constant calender roll pressure, there is no countermeasure for the difference in smoothness in the longitudinal direction resulting from winding of the coated stock material, and the variation in quality in the lengthwise direction tends to carry over into the final product.

Accordingly, in the calendering step, it is desirable to vary the calendering conditions, such as the calender roll pressure, to cancel out the different in smoothness in the longitudinal direction that is produced by winding of the coated stock material. Specifically, it is desirable to reduce the calender roll pressure from the center to the outside of the coated stock material that is wound off the take-up roll. Based on an investigation by the present inventors, lowering the calender roll pressure decreases the glossiness (smoothness diminishes). Thus, the difference in smoothness in the longitudinal direction that is produced by winding of the coated stock material is cancelled out, yielding a final product free of variation in quality in the longitudinal direction.

An example of changing the pressure of the calender rolls has been described above. Additionally, it is possible to control the calender roll temperature, calender roll speed, and calender roll tension. Taking into account the properties of a particulate medium, it is desirable to control the surface smoothness by means of the calender roll pressure and calender roll temperature. Generally, the calender roll pressure is reduced, or the calender roll temperature is lowered, to diminish the surface smoothness of the final product. Conversely, the calender roll pressure can be increased or the calender roll temperature can be raised to increase the surface smoothness of the final product.

Rolls of a heat-resistant plastic such as epoxy, polyimide, polyamide, or polyamidoimide, can be employed as the calender rolls. Processing with metal rolls is also possible.

As for the calendaring conditions, the calender roll temperature ranges from, for example, 60 to 100° C., preferably 70 to 100° C., and more preferably 80 to 100° C. The pressure ranges from, for example, 100 to 500 kg/cm (98 to 490 kN/m), preferably 200 to 450 kg/cm (196 to 441 kN/m), and more preferably 300 to 400 kg/cm (294 to 392 kN/m).

The magnetic recording medium obtained can be cut to desired size with a cutter or the like. The cutter is not specifically limited, but desirably comprises multiple sets of a rotating upper blade (male blade) and lower blade (female blade). The slitting speed, engaging depth, peripheral speed ratio of the upper blade (male blade) and lower blade (female blade) (upper blade peripheral speed/lower blade peripheral speed), period of continuous use of slitting blade, and the like are suitably selected. The coated stock material wound in a roll state before cutting can be heated to reduce the distortion of stock material. Further, it is preferable in the present invention that the stock material that has been cut is wound (rewound) and the stock material thus wound is heated to reduce indentations on the magnetic layer surface. Such heating process is described in, for example, Japanese Unexamined Patent Publication (KOKAI) No. 2007-4874, which is expressly incorporated herein by reference in its entirety.

Physical Characteristics

The saturation magnetic flux density of the magnet layer is preferably 100 to 400 mT. The coercivity (Hc) of the magnetic layer is preferably 143.2 to 318.3 kA/m (approximately 1,800 to 4,000 Oe), more preferably 159.2 to 278.5 kA/m (approximately 2,000 to 3,500 Oe). Narrower coercivity distribution is preferable. The SFD and SFDr are preferably equal to or lower than 0.6, more preferably equal to or lower than 0.3.

The coefficient of friction of the magnetic recording medium relative to the head is, for example, equal to or less than 0.5 and preferably equal to or less than 0.3 at temperatures ranging from −10° C. to 40° C. and humidity ranging from 0 percent to 95 percent, the surface resistivity on the magnetic surface preferably ranges from $10^4$ to $10^8$ ohm/sq, and the charge potential preferably ranges from −500 V to +500 V. The modulus of elasticity at 0.5 percent extension of the magnetic layer preferably ranges from 0.98 to 19.6 GPa (approximately 100 to 2,000 kg/mm$^2$) in each in-plane direction. The breaking strength preferably ranges from 98 to 686 MPa (approximately 10 to 70 kg/mm$^2$). The modulus of elasticity of the magnetic recording medium preferably ranges from 0.98 to 14.7 GPa (approximately 100 to 1500 kg/mm$^2$) in each in-plane direction. The residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent.

The glass transition temperature (i.e., the temperature at which the loss elastic modulus of dynamic viscoelasticity peaks as measured at 110 Hz with a dynamic viscoelastometer, such as RHEOVIBRON made by A&D Co. Ltd) of the magnetic layer preferably ranges from 50 to 180° C., and that of the nonmagnetic layer preferably ranges from 0 to 180° C. The loss elastic modulus preferably falls within a range of $1 \times 10^7$ to $8 \times 10^8$ Pa (approximately $1 \times 10^8$ to $8 \times 10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by equal to or less than 10 percent, in each in-plane direction of the medium.

The residual solvent contained in the magnetic layer is preferably equal to or less than 100 mg/m$^2$ and more preferably equal to or less than 10 mg/m$^2$. The void ratio in the coated layers, including both the nonmagnetic layer and the magnetic layer, is preferably equal to or less than 40 volume percent, more preferably equal to or less than 30 volume percent. Although a low void ratio is preferable for attaining high output, there are some cases in which it is better to ensure a certain level based on the object. For example, in many cases, larger void ratio permits preferred running durability in disk media in which repeat use is important.

Physical properties of the nonmagnetic layer and magnetic layer may be varied based on the objective in the magnetic recording medium of the present invention. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

Magnetic Signal Reproduction Method and Magnetic Signal Reproduction System

The present invention further relates to:

a method of reproducing magnetic signals, comprising:

reproducing magnetic signals that have been recorded on the magnetic recording medium of the present invention with a reproduction head with a track width ranging from 1 to 5 μm; and a magnetic signal reproduction system, comprising:

the magnetic recording medium of the present invention, and a reproduction head with a track width ranging from 1 to 5 μm.

The magnetic recording medium of the present invention can reduce dropout and yield a good S/N ratio even when recording a signal at a high surface recording density of 2 to 7 Gb/inch$^2$, for example. To reproduce with high sensitivity a signal that has been recorded at such a high density, the track width of the reproduction head is preferably 1 to 5 μm, more preferably 1 to 4 μm. The reproduction head is desirably either a magnetoresistive (MR) head or a giant magnetoresistive (GMR) head that is capable of reproducing with high sensitivity a signal that has been recorded at high density. The distance between shields (sh-sh) in the reproduction head is, for example, 0.1 to 0.3 μm.

EXAMPLES

The present invention will be described in detail below based on examples. However, the present invention is not limited to the examples. The term "parts" given in Examples are weight parts unless specifically stated otherwise.

Example 1

Of the components of the nonmagnetic layer coating liquid listed below, agents 1 were kneaded in a kneader and then dispersed in a sand mill to achieve a retention time of 90 minutes. Agents 2 were then added, stirred, and filtered with a filter having an average pore size of 1 micrometer to prepare a nonmagnetic layer coating liquid.

Separately, of the components of the magnetic layer coating liquid listed below, agents 1 were kneaded in a kneader and then dispersed in a sand mill to achieve a retention time of 60 minutes. Agents 2 of the components of the magnetic layer coating liquid were then added, stirred, and filtered with a filter having an average pore size of 1 micrometer to prepare a magnetic layer coating liquid.

Components of Nonmagnetic Layer Coating Liquid (Agents 1)
  Iron oxide powder (particle diameter: 0.15×0.02 μm): 100 parts
  Alumina (α-conversion rate: 50 percent, particle diameter: 0.05 μm): 5 parts
  Carbon black particle diameter: 15 nm): 25 parts
  Vinyl chloride copolymer (—SO$_3$Na group content: 1.2×10$^{-4}$ equivalent/g): 15 parts
  Polyester polyurethane resin (Tg: 40° C., —SO$_3$Na group content: 1×10$^{-4}$ equivalent/g): 8 parts
  Cyclohexanone: 150 parts
  Methyl ethyl ketone: 250 parts (Agents 2)
  Butyl stearate: 3 parts
  Stearic acid: 5 parts
  Polyisocyanate: 6 parts
  Cyclohexanone: 40 parts
  Methyl ethyl ketone: 60 parts Components of Magnetic Layer Coating Liquid (Agents 1)
  Fe-based ferromagnetic metal powder (Co/Fe: 30 atomic percent, Y/(Fe+Co): 3 atomic percent, Al/(Fe+Co): 5 weight percent, Ca/Fe: 0.002, as: 155 A·m$^2$/kg, Hc: 188.2 kA/m, pH: 9.4, major axis length: 45 nm): 100 parts
  Vinyl chloride-hydroxypropyl acrylate copolymer (—SO$_3$Na group content: 0.7×10$^{-4}$ equivalent/g): 13.0 parts
  Polyester polyurethane resin (—SO$_3$Na group content: 1×10$^{-4}$ equivalent/g): 5.5 parts
  α-alumina (mean particle diameter: 0.15 micrometer): 12 parts
  α-alumina (mean particle diameter: 0.05 micrometer): 4 parts
  Carbon black (mean particle diameter: 50 nm, DBP oil absorption capacity: 72 cc/100 g): 4 parts
  Methyl acid phosphate: 2 parts
  Cyclohexanone: 120 parts
  Methyl ethyl ketone: 180 parts (Agents 2)
  Stearic acid: 1.5 parts
  Oleyl oleate: 5 parts
  Polyisocyanate: 3 parts
  Cyclohexanone: 90 parts
  Methyl ethyl ketone: 130 parts The components of the backcoat layer coating liquid listed below were kneaded and then dispersed in a sand mill. To the dispersion obtained were added 15 parts of polyisocyanate and 1,000 parts of methyl ethyl ketone. The mixture was filtered with a filter having an average pore size of 0.5 micrometer to prepare a backcoat layer coating liquid.

Components of Backcoat Layer Coating Liquid
  Microgranular carbon black 1 (mean particle size: 34 nm, maximum particle diameter: 80 nm): 100 parts
  Coarse granular carbon black 2 (mean particle size: 80 nm, maximum particle diameter: 180 nm: 4 parts
  α-iron oxide particle (mean particle size: 0.1 micrometer): 18 parts
  α-alumina (hard inorganic powder, mean particle size: 0.18 micrometer): 1 part
  Nitrocellulose resin: 55 parts
  Polyurethane resin: 45 parts
  Polyester resin: 5 parts
  Copper oleate (dispersion agent): 5 parts
  Copper phthalocyanine (dispersion agent): 5 parts
  Methyl ethyl ketone: 500 parts
  Toluene: 200 parts The various coating liquids that had been prepared and the device shown in FIG. 1 were employed to manufacture magnetic tape by the method indicated below.

The above nonmagnetic layer coating liquid was coated to a support 1, comprised of a film of polyethylene naphthalate (PEN) resin 6 micrometers in thickness and having a density of protrusions equal to or greater than 50 nm in height of 100/mm$^2$ as measured by contact needle-type three-dimensional roughness meter, in such a manner as to yield a thickness of 1.1 micrometer on a single side following drying and calendering. The above magnetic layer coating liquid was then coated dry-on-wet to the nonmagnetic layer in such a manner as to achieve a magnetic layer 3 with a thickness of 70 nm following drying and calendering, oriented, and then dried with a drier and far infrared radiation irradiating device to form magnetic layer 3.

Subsequently, the above backcoat layer coating liquid was coated in such a manner as to yield a thickness of 0.5 micrometer upon drying to the other surface (the opposite surface from magnetic layer 3) of support 2 and dried to form backcoat layer 4. A stock material 1 with magnetic layer 3 provided on one side of support 2 and backcoat layer 4 on the other side thereof was thus obtained.

Stock material 1 thus obtained was mirror-surface processed with a seven-stage calender comprised of metal rolls under conditions of a temperature of 80° C. and a linear pressure of 2 kN/cm (200 kgf/cm), and wound with a tension of 50 N/m (5.1 kgf/m). The roll of wound stock material was stored for 24 hours in a 70° C. oven. The roll of stock material thus obtained was then cut to a width of 12.65 mm (½ inch).

The cut stock material 1 was wound at a tension of 1 N (102 gf) on a 200 φ hub made of aluminum having a 0.3 degree taper. In this process, the edge on the large hub diameter side was designated the reference edge. The stock material wound on the hub was then stored for another 24 hours in an oven regulated at a temperature of 60° C. and a humidity of 50 percent.

The magnetic tape MT that had been thus manufactured was subjected to a surface polishing treatment (air pressure 0.25 MPa, polishing time 0.1 s) with a chromium oxide polishing tape (KX20000: chromium oxide mean particle diameter 0.6 micrometer, surface roughness 0.07 micrometer). A servo signal was recorded on magnetic layer 3 based on LTO Generation 3 format and the tape was wound into a cassette to fabricate a magnetic tape cartridge.

Example 2

With the exception that the precision of the filter employed during preparation of the backcoat layer coating liquid was changed from 0.5 micrometer to 0.3 micrometer, a magnetic tape was prepared in the same manner as in Example 1.

Example 3

With the exception of the use of a support 2 comprised of a film of polyethylene naphthalate (PEN) resin in which the density of protrusions equal to or greater than 50 nm in height was changed to 5/mm$^2$ as measured with a three-dimensional roughness meter by changing the quantity of filler of the support on the surface on which the backcoat layer was formed 1/10 that of support 1 employed in Example 1, a magnetic tape was prepared in the same manner as in Example 1.

Example 4

With the exception of the use of a support 3 comprised of a film of polyethylene naphthalate (PEN) resin in which the density of protrusions equal to or greater than 50 nm in height was changed to 130/mm$^2$ as measured with a three-dimensional roughness meter by changing the quantity of filler of the support on the surface on which the backcoat layer was formed to 1.5-fold that of support 1 employed in Example 1, a magnetic tape was prepared in the same manner as in Example 1.

Comparative Example 1

With the exception that the mean particle size of the microgranular carbon black particles employed in the backcoat layer coating liquid was changed to 50 nm, a magnetic tape was prepared in the same manner as in Example 1.

Comparative Example 2

With the exception that the precision of the filter employed during the preparation of the backcoat layer coating liquid was changed to 0.1 micrometer, a magnetic tape was prepared in the same manner as in Example 1.

Comparative Example 3

With the exception of the use of a support 4 comprised of a film of polyethylene naphthalate (PEN) resin in which the density of protrusions equal to or greater than 50 nm in height was changed to 200/mm$^2$ as measured with a three-dimensional roughness meter by changing the quantity of filler of the support on the surface on which the backcoat layer was formed to 3-fold that of support 1 employed in Example 1, a magnetic tape was prepared in the same manner as in Example 1.

Comparative Example 4

With the exception that the precision of the filter employed during the preparation of the backcoat layer coating liquid was changed to 1 micrometer, a magnetic tape was prepared in the same manner as in Example 1.

Comparative Example 5

The components of the backcoat layer coating liquid listed below were kneaded, and then dispersed in a sand mill. To the dispersion obtained were added 40 parts of polyisocyanate and the mixture was passed through a filter with an average pore size of 1 micrometer to prepare a backcoat layer coating liquid. With the exception of the backcoat layer coating liquid, a cut stock material was prepared in the same manner as in Example 1. No heat treatment was conducted following the cutting conducted in Example 1. As in Example 1, the magnetic tape MT thus obtained was subjected to the surface polishing treatment, a servo signal was recorded on magnetic layer 3 based on LTO Generation 3 format, and the tape was wound into a cassette to prepare a magnetic tape cartridge.

Components of Backcoat Layer Coating Liquid
  Microgranular carbon black 1 (mean particle size: 17 nm, maximum particle diameter: 42 nm): 100 parts
  Coarse granular carbon black 2 (mean particle size: 100 nm, maximum particle diameter: 280 nm: 16 parts
  α-alumina (hard inorganic powder, mean particle size: 0.18 micrometer, Mohs' hardness: 9): 2 part
  Nitrocellulose resin: 130 parts
  Polyurethane resin: 15 parts
  Methyl ethyl ketone: 2000 parts
  Toluene: 600 parts Comparative Example 6

The components of the backcoat layer coating liquid listed below were kneaded, and then dispersed in a sand mill. To the dispersion obtained were added 40 parts of polyisocyanate and 1,000 parts of methyl ethyl ketone and the mixture was passed through a filter with an average pore size of 1 micrometer to prepare a backcoat layer coating liquid. With the exception of the backcoat layer coating liquid, a magnetic tape cartridge was fabricated in the same manner as in Example 1.

Components of Backcoat Layer Coating Liquid
Microgranular carbon black 1 (mean particle size: 34 nm, maximum particle diameter: 82 nm): 100 parts
Coarse granular carbon black 2 (mean particle size: 80 nm, maximum particle diameter: 183 nm): 10 parts
α-iron oxide particle (mean particle size: 0.1 micrometer): 20 parts
α-alumina (hard inorganic powder, mean particle size: 0.2 micrometer): 5 part
Nitrocellulose resin: 50 parts
Polyurethane resin: 50 parts
Polyester resin: 5 parts
Copper oleate (dispersion agent): 5 parts
Copper phthalocyanine (dispersion agent): 5 parts
Methyl ethyl ketone: 500 parts
Toluene: 200 parts Evaluation Methods The various magnetic tapes MT of Examples 1 to 4 and Comparative Examples 1 to 5 were measured by the following methods. As Examples 5 to 7, electromagnetic characteristics of magnetic tapes, that were same as that of Example 1, were measured with reproduction heads with track widths of 1.5, 4.5, and 7.5 micrometers. The measurement results are given in Tables 1 and 2.

1. Average Surface Roughness Ra and Protrusion Density of the Backcoat Layer as Measured by Atomic Force Microscopy Measurement was conducted under the following conditions with an SPA500 made by Seiko Instruments:

| Measurement mode: | contact mode |
|---|---|
| Scanning rate: | 2 Hz |
| Measurement area: | 90 × 90 micrometers |
| Data points: | 512 × 512 picture elements |

Ra was the average center surface roughness (nm) within the above measurement area.

2. Protrusion Density as Measured by Contact Needle-Type Three-Dimensional Surface Roughness Meter Measurement was conducted with a Surf Coder SE3500 surface roughness meter made by Kosaka Laboratory, Ltd. The PU-DJ2S analysis program of the same corporation was employed to calculate the protrusion density. A range 1,500 micrometers in the longitudinal direction and 500 micrometers in the width direction of the tape was measured with a 5 micrometer pitch in the width direction, a contact needle displacement rate of 0.2 mm/s in the longitudinal direction, and a low-range cutoff of 0.25 mm. A PC-DR2 made by the same corporation was employed as the contact needle pickup. The radius of curvature of the contact needle was 2 micrometers.

3. Method of Measuring the Number of Indentations on the Magnetic Layer Surface as Measured by AFM The number of indentations equal to or greater than 30 nm in depth was counted under the conditions stated below with an SPA500 made by Seiko Instruments. The average plane referred herein is the plane at which the volume of protrusions equaled the volume of indentations in the measurement plane.

| Measurement mode: | contact mode |
|---|---|
| Scanning rate: | 2 Hz |
| Measurement scope: | 40 × 40 micrometers |
| Data points: | 512 × 512 picture elements |

4. Surface Recording Density

The surface recording density was obtained as the product of the recording density (400 kbi) and reproduction track density (tpi). A value of equal to or greater than 2.0 Gb/in$^2$ was considered good.

5. Dropout

A 400 kbpi signal was recorded and reproduced, and the number of times this had been conducted when the reproduction signal decreased by equal to or more than 50 percent was determined. The value obtained was converted to a value per MB as the dropout. The target was equal to or less than 5/MB.

6. S/N Ratio sk and Error Rate

A 400 kbpi signal was recorded and reproduced and the S/N ratio sk and error rate were determined. The targeted S/N ratio sk was equal to or greater than 5 dB and the targeted error rate was equal to or less than 1/MB.

7. Edge Damage

The entire length of the tape was repeatedly run back and forth 5,000 times, at which point the tape edges were examined. The number of spots where the tape edge had creased by a width of equal to or more than 50 micrometers was counted. A tape in which the number of creased spots was fewer than 5 was evaluated as "Excellent," 5 or more spots but fewer than 10 as "Good," and 10 spots or more as "Poor."

An IBM LTO drive, the "3580-L33," with a modified reproduction head track width, was employed to measure the dropout, S/N ratio sk, error rate, and edge damage.

8. Frictional Coefficient of the Backcoat Layer

The tape was lapped at 180° with the back layer surface in contact with the pole surface on an Ra 10 nm, 4 mm diameter SUS420J pole, and slid at a rate of 24 mm/s with a load of 100 g (T1). The tape tension T2 was measured at pass 1 and pass 1,000. The frictional coefficient μ was calculated from Euler's equation below. The target was equal to or lower than 0.3.

$$\mu = 1/\pi \times ln\,(T2/T1)$$

where in denotes a natural log.

TABLE 1

|  | (1) | (2) | (3) | (4) | (5) | (6) |
|---|---|---|---|---|---|---|
| Example 1 | 34 nm | 80 nm | 4 parts | 0.5 μm | Support 1 | Conducted |
| Example 2 | 34 nm | 80 nm | 4 parts | 0.3 μm | Support 1 | Conducted |
| Example 3 | 34 nm | 80 nm | 4 parts | 0.5 μm | Support 2 | Conducted |
| Example 4 | 34 nm | 80 nm | 4 parts | 0.5 μm | Support 3 | Conducted |
| Example 5 | 34 nm | 80 nm | 4 parts | 0.5 μm | Support 1 | Conducted |
| Example 6 | 34 nm | 80 nm | 4 parts | 0.5 μm | Support 1 | Conducted |
| Example 7 | 34 nm | 80 nm | 4 parts | 0.5 μm | Support 1 | Conducted |
| Comp. Ex. 1 | 50 nm | 80 nm | 4 parts | 0.5 μm | Support 1 | Conducted |
| Comp. Ex. 2 | 34 nm | 80 nm | 4 parts | 0.1 μm | Support 1 | Conducted |
| Comp. Ex. 3 | 34 nm | 80 nm | 4 parts | 0.5 μm | Support 4 | Conducted |

TABLE 1-continued

| | (1) | (2) | (3) | (4) | (5) | (6) |
|---|---|---|---|---|---|---|
| Comp. Ex. 4 | 34 nm | 80 nm | 4 parts | 1 μm | Support 1 | Conducted |
| Comp. Ex. 5 | 17 nm | 100 nm | 16 parts | 1 μm | Support 1 | Not conducted |
| Comp. Ex. 6 | 34 nm | 80 nm | 10 parts | 1 μm | Support 1 | Conducted |

(1): Mean particle size of microgranular carbon black in the backcoat layer
(2): Mean particle size of coarse granular carbon black in the backcoat layer
(3): Quantity of coarse granular carbon black added to the backcoat layer
(4): Average pore diameter of filter for the preparation of backcoat layer coating liquid
(5): Type of support
(6): Heat treatment following cutting

| | (1) | (2) | (3) | (4) | (5) | (6) | (7) |
|---|---|---|---|---|---|---|---|
| Example 1 | 100/mm$^2$ | 2.5 μm | 15/mm$^2$ | 20 | 53 | 25 | 4.1 |
| Example 2 | 100/mm$^2$ | 2.5 μm | 3/mm$^2$ | 18 | 48 | 5 | 4.1 |
| Example 3 | 5/mm$^2$ | 2.5 μm | 5/mm$^2$ | 20 | 58 | 13 | 4.1 |
| Example 4 | 130/mm$^2$ | 2.5 μm | 28/mm$^2$ | 21 | 56 | 62 | 4.1 |
| Example 5 | 100/mm$^2$ | 1.5 μm | 15/mm$^2$ | 20 | 53 | 25 | 6.8 |
| Example 6 | 100/mm$^2$ | 4.5 μm | 15/mm$^2$ | 20 | 53 | 25 | 2.3 |
| Example 7 | 100/mm$^2$ | 7.5 μm | 15/mm$^2$ | 20 | 53 | 25 | 1.4 |
| Comp. Ex. 1 | 100/mm$^2$ | 2.5 μm | 20/mm$^2$ | 40 | 80 | 94 | 4.1 |
| Comp. Ex. 2 | 100/mm$^2$ | 2.5 μm | 0/mm$^2$ | 16 | 45 | 8 | 4.1 |
| Comp. Ex. 3 | 175/mm$^2$ | 2.5 μm | 70/mm$^2$ | 27 | 65 | 190 | 4.1 |
| Comp. Ex. 4 | 100/mm$^2$ | 2.5 μm | 55/mm$^2$ | 23 | 55 | 125 | 4.1 |
| Comp. Ex. 5 | 100/mm$^2$ | 2.5 μm | 85/mm$^2$ | 12 | 58 | 320 | 4.1 |
| Comp. Ex. 6 | 100/mm$^2$ | 2.5 μm | 80/mm$^2$ | 30 | 70 | 260 | 4.1 |

(1): Density of protrusions equal to or greater than 50 nm in height, as measured by a contact needle-type three-dimensional surface roughness meter, on the surface on the backcoat layer side of the support
(2): Recording track width
(3): Density of protrusions equal to or greater than 50 nm in height, as measured by a contact needle-type three-dimensional surface roughness meter, on the backcoat layer surface
(4): Average surface roughness of the backcoat layer surface, as measured by AFM
(5): Density protrusions (per 90 μm × 90 μm) equal to or greater than 100 nm in height, as measured by AFM, on the backcoat layer surface
(6): Number of indentations (per 40 μm × 40 μm) on the magnetic layer surface
(7): Surface recording density (Gb/in$^2$)

TABLE 2

| | (1) | (2) | (3) | (4) | (5) | (6) |
|---|---|---|---|---|---|---|
| Example 1 | 1.5/MB | 7.0 | 0.2 | 0.24 | 0.26 | Excellent |
| Example 2 | 0.5/MB | 7.2 | 0.1 | 0.26 | 0.28 | Good |
| Example 3 | 0.7/MB | 7.2 | 0.1 | 0.26 | 0.28 | Good |
| Example 4 | 4.0/MB | 6.0 | 0.5 | 0.23 | 0.25 | Excellent |
| Example 5 | 3.0/MB | 5.5 | 0.8 | 0.24 | 0.26 | Excellent |
| Example 6 | 0.5/MB | 10.0 | 0.1 | 0.24 | 0.26 | Excellent |
| Example 7 | 0.05/MB | 12.0 | 0.05 | 0.24 | 0.26 | Excellent |
| Comp. Ex. 1 | 3.0/MB | 3.0 | 4.0 | 0.27 | 0.30 | Good |
| Comp. Ex. 2 | 1.0/MB | 7.0 | 0.1 | 0.35 | 0.45 | Poor |
| Comp. Ex. 3 | 25.0/MB | 4.0 | 5.0 | 0.25 | 0.26 | Excellent |
| Comp. Ex. 4 | 10.0/MB | 6.0 | 3.0 | 0.25 | 0.30 | Good |
| Comp. Ex. 5 | 70.0/MB | 5.1 | 20.0 | 0.27 | 0.50 | Poor |
| Comp. Ex. 6 | 40.0/MB | 5.1 | 7.0 | 0.27 | 0.26 | Excellent |

(1): Dropout
(2): SNRsk
(3): Error rate
(4): Frictional coefficient of the backcoat layer surface (1 pass)
(5): Frictional coefficient of the backcoat layer surface (1000 passes)
(6): Edge damage Evaluation Results As shown in Tables 1 and 2, low dropout, high S/N ratios, and low error rates were achieved in Examples 1 to 7. The frictional coefficient of the backcoat layer was low both before and after running, there was little edge damage, and good running properties and running durability were achieved in Examples 1 to 7. These results indicate that the present invention provided a magnetic recording medium exhibiting good electromagnetic characteristics and running durability over a wide range of recording densities.

By contrast, the S/N ratio was low and the error rate increased in Comparative Example 1, in which the surface roughness of the backcoat layer exceeded 25 nm. Electromagnetic characteristics were good, but the frictional coefficient increased markedly with repeated running and edge damage was observed in Comparative Example 2, in which the density of protrusions equal to or greater than 50 nm in height on the backcoat layer surface as measured by contact needle-type three-dimensional surface roughness meter was 0/mm$^2$. In Comparative Example 4, the protrusion density exceeded 50/mm$^2$. In Comparative Example 6, the average surface roughness of the backcoat layer surface exceeded 25 and the density of protrusions equal to or greater than 50 nm in height on the backcoat layer surface as measured by contact needle-type three-dimensional surface roughness meter exceeded 50/mm$^2$. In both Comparative Examples 4 and 6, running durability was good, but good electromagnetic characteristics could not be achieved.

Good running durability was achieved but electromagnetic characteristics deteriorated markedly in Comparative Example 3, in which the average surface roughness of the backcoat layer surface exceeded 25 nm and in which the density of protrusions equal to or greater than 50 nm in height on the backcoat layer surface as measured by contact needle-type three-dimensional surface roughness meter exceeded 50/mm$^2$.

Both electromagnetic characteristics and running durability deteriorated markedly in Comparative Example 5, in which the average surface roughness of the backcoat layer surface was less than 15 nm and in which the density of protrusions equal to or greater than 50 nm in height on the backcoat layer surface as measured by contact needle-type three-dimensional surface roughness meter exceeded 50/mm$^2$.

The results of Tables 1 and 2 reveal that in the high-density recording region (for example, 2.0 Gb/inch$^2$ and above), there was not necessarily a good correlation between the number of protrusions on the backcoat layer surface as measured by AFM and electromagnetic characteristics.

The magnetic recording medium of the present invention is suitable as a magnetic tape for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

What is claimed is:

1. A magnetic recording medium comprising a magnetic layer comprising a ferromagnetic powder and a binder on one surface of a nonmagnetic support and a backcoat layer comprising a granular material and a binder on the other surface of the nonmagnetic support, wherein
    the backcoat layer has an average surface roughness ranging from 15 to 25 nm, as measured by an atomic force microscope, and
    a density of protrusions equal to or greater than 50 nm in height ranges from 1 to 50/mm$^2$ on the backcoat layer surface, as measured by a three-dimensional surface roughness meter with a contact needle.

2. The magnetic recording medium according to claim 1, wherein a density of protrusions equal to or greater than 50 nm in height ranges from 1 to 30/mm$^2$ on the backcoat layer surface, as measured by a three-dimensional surface roughness meter with a contact needle.

3. The magnetic recording medium according to claim 1, wherein the nonmagnetic support has a density of protrusions equal to or greater than 50 nm in height ranging from 1 to 150/mm$^2$ on the surface on the backcoat layer side, as measured by a three-dimensional surface roughness meter with a contact needle.

4. The magnetic recording medium according to claim 1, wherein a number of indentations with a depth of equal to or greater than 30 nm is equal to or less than 100 per 40 micrometer square on the magnetic layer surface, as measured by an atomic force microscope.

5. A method of reproducing magnetic signals, comprising:
    reproducing magnetic signals that have been recorded on the magnetic recording medium according to claim 1 with a reproduction head with a track width ranging from 1 to 5 μm.

6. A magnetic signal reproduction system, comprising:
    the magnetic recording medium according to claim 1, and a reproduction head with a track width ranging from 1 to 5 μm.

* * * * *